United States Patent
Arnold et al.

(10) Patent No.: US 11,501,114 B2
(45) Date of Patent: Nov. 15, 2022

(54) GENERATING MODEL INSIGHTS BY PROGRESSIVE PARTITIONING OF LOG DATA ACROSS A SET OF PERFORMANCE INDICATORS

(71) Applicant: INTERNATIONAL BUSINESS MACHINES CORPORATION, Armonk, NY (US)

(72) Inventors: Matthew Arnold, Ridgefield Park, NJ (US); Evelyn Duesterwald, Millwood, NY (US); Darrell Reimer, Tarrytown, NY (US); Michael Desmond, White Plains, NY (US); Harold Leon Ossher, South Salem, NY (US); Robert Yates, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 583 days.

(21) Appl. No.: 16/701,128

(22) Filed: Dec. 2, 2019

(65) Prior Publication Data
US 2021/0166079 A1    Jun. 3, 2021

(51) Int. Cl.
*G06K 9/62*    (2022.01)
*G06F 17/18*   (2006.01)
*G06N 20/00*   (2019.01)

(52) U.S. Cl.
CPC .......... *G06K 9/6262* (2013.01); *G06F 17/18* (2013.01); *G06K 9/623* (2013.01); *G06K 9/6261* (2013.01); *G06N 20/00* (2019.01)

(58) Field of Classification Search
CPC .... G06K 9/6262; G06K 9/623; G06K 9/6261; G06F 17/18; G06N 20/00
See application file for complete search history.

(56) References Cited

U.S. PATENT DOCUMENTS 7,219,099 B2    5/2007  Kuntala et al.
7,480,640 B1    1/2009  Elad et al.
(Continued)

OTHER PUBLICATIONS

Mell, P. et al., "Recommendations of the National Institute of Standards and Technology"; NIST Special Publication 800-145 (2011); 7 pgs.

*Primary Examiner* — Christopher M Brandt
(74) *Attorney, Agent, or Firm* — Intelletek Law Group, PLLC; Gabriel Daniel, Esq.

(57) ABSTRACT

The generating of actionable recommendations for tuning model metrics of an Artificial Intelligence (AI) system includes partitioning a key performance indicator (KPI) range associated with a target system into a plurality of buckets. Log data including at least one KPI of the target system and one or more AI model metrics is partitioned and distributed across the plurality of buckets. For each bucket, an aggregate value of the one or more AI model metrics across the log data is computed and weighted according to the volume of log data in that bucket. A correlation factor between the aggregate value and a representative KPI value for each bucket is determined. A model tuning recommendation to increase ranking of the AI model metrics according to the determined correlation factor is provided to an output device and/or to the AI system for updating the one or more AI model.

20 Claims, 9 Drawing Sheets

(56) References Cited

U.S. PATENT DOCUMENTS

| | | | |
|---|---|---|---|
| 8,938,375 B2* | 1/2015 | Moll | G06F 17/11 |
| | | | 703/2 |
| 9,165,270 B2 | 10/2015 | Dickinson et al. | |
| 10,068,174 B2 | 9/2018 | Aili et al. | |
| 2009/0281845 A1 | 11/2009 | Fukuda et al. | |
| 2014/0143023 A1* | 5/2014 | Reddington | G06Q 10/0637 |
| | | | 705/7.36 |
| 2016/0034509 A1 | 2/2016 | Carmi | |
| 2017/0185921 A1 | 6/2017 | Zhang | |
| 2017/0351689 A1 | 12/2017 | Vasudevan | |
| 2018/0225588 A1* | 8/2018 | Khidekel | G06N 7/005 |
| 2018/0336172 A1 | 11/2018 | Goyal et al. | |
| 2019/0349257 A1* | 11/2019 | Wang | H04L 43/0817 |
| 2020/0019822 A1* | 1/2020 | Kothandaraman | G06F 11/34 |
| 2021/0158179 A1* | 5/2021 | Cmielowski | G06N 20/00 |

\* cited by examiner

GENERATING MODEL INSIGHTS BY PROGRESSIVE PARTITIONING OF LOG DATA ACROSS A SET OF PERFORMANCE INDICATORS

BACKGROUND

Technical Field

The present disclosure generally relates to cognitive computing, and more particularly, to determining actionable insights about an artificial intelligence (AI) system.

Description of the Related Art

In many fields, there is an increasing use of metrics to provide accurate performance indicators in an objective manner. There is also an increasing use of machine learning models in AI systems. Such machine learning models have their own model metrics to measure performance of the AI system.

SUMMARY

According to various embodiments, a computing device, a non-transitory computer readable storage medium and a computer-implemented method of generating actionable insights of AI systems to key performance indicators (KPIs) of an associated operation.

In one embodiment, a computer-implemented method of generating actionable recommendations for tuning metric models of an Artificial Intelligence (AI) system includes partitioning of a key performance indicator (KPI) range associated with a target AI system into a plurality of buckets, and partitioning log data including at least one KPI and one or more AI model metrics across the plurality of buckets. For each bucket of the plurality of buckets, computing, for each bucket of the plurality of buckets, an aggregate value of the one or more AI model metrics across the log data. A correlation factor is determined between the aggregate values and representative KPI values of the plurality of buckets. A model tuning recommendation is output for increasing a ranking of the one or more AI model metrics according to the determined correlation factor.

In one embodiment, the partitioning of the log data includes generating a histogram of the log data.

In one embodiment, the calculating of the aggregate summary model metric value further includes generating a grid of K rows and N columns where K is the number of KPI buckets and N is a number of model metrics and each cell (k,n) is an aggregate measurement of metric n across log entries in bucket k.

In one embodiment, the tuning recommendation includes tuning procedures to execute a total of E exploration operations through a random search of values of K, the number of KPI buckets, or a systematically explored grid search of K, and selecting a value of K among the E explored options having a maximal correlation factor.

In one embodiment, a plurality of KPIs range from KPI_1 to KPI_m, and the plurality of buckets are formed by: determining a partitioning of KPI_1 into K_1 buckets; creating sub-buckets from each of the K_1 buckets by determining a nested partitioning of each of the K_1 buckets according to partitioning KPI_2 into K_2 sub-buckets; and progressively creating further sub-buckets for the remaining KPIs KPI_3 through KPI.

In an embodiment, a computing device for determining actionable recommendations for tuning model metrics of an Artificial Intelligence (AI) system includes a core mechanism having a processor. A storage device is coupled to the core mechanism. The processor is configured to analyze log data including at least one key performance indicator (KPI) from a target system and associated one or more AI model metrics from the AI system, generate a series of progressive nested partitions of the log data based on a computed ranking of the one or more AI model metrics, and output a report identifying actionable recommendations to tune at least one AI model metric to increase the at least one KPI of the target system.

In one embodiment, the processor is configured to perform nested partitions of the log data, and to update the deployed machine learning model of the AI system with at least one tuning recommendation.

In an embodiment, a non-transitory computer readable storage medium tangibly embodying a computer readable program code having computer readable instructions that, when executed, causes a computer device to generate actionable recommendations for tuning model metrics of an Artificial Intelligence (AI) system. The method includes partitioning a key performance indicator (KPI) range associated with a target system into a plurality of buckets, and partitioning log data including at least one KPI of the target system and one or more AI model metrics across the plurality of buckets. For each bucket, a summary model metric value for each of the one or more AI model metrics across the log data is computed. A tuning recommendation of the one or more AI model metrics ranked according to the determined correlation factor is output.

In an embodiment, the summary value may be weighted by the volume of log entries that were assigned to that particular bucket. A correlation factor between the summary model metric values and representative KPI values for each bucket of the plurality of buckets is determined.

In an embodiment, the representative values may be an average, maximum, minimum, or other aggregate value.

In an embodiment, the model tuning action includes an interactive active learning session.

In an embodiment, the model tuning action is a hyperparameter tuning of the AI model metrics.

These and other features will become apparent from the following detailed description of illustrative embodiments thereof, which is to be read in connection with the accompanying drawings.

BRIEF DESCRIPTION OF THE DRAWINGS

The drawings are illustrative of the embodiments. They do not illustrate all the embodiments. Other embodiments may be used in addition or instead. Details that may be apparent or unnecessary may be omitted to save space or for more effective illustration. Some embodiments may be practiced with additional components or operations and/or without all the components or operations that are illustrated. When the same numeral appears in different drawings, it refers to the same or like components or operations.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In an embodiment, an aspect of the present disclosure includes discovering a hidden linkage between AI-level model metrics and KPIs of an associated (e.g., target) AI system. In a non-limiting example, the KPIs may be key performance indicators of network operations. In still another non-limiting example, the KPIs may be key performance indicators of health care delivery. In all of the aforementioned non-limiting examples, the AI model metric can be part of a machine learning system such as a model confidence metric or a model accuracy metric. The various aspects of the present disclosure provide an improvement in machine learning systems by providing tuning recommendations in the operation of the machine learning systems that can correlate with increased KPI scores, and an improvement in computer operations.

Reference now is made in detail to the examples illustrated in the accompanying drawings and discussed below.

Example Architecture

Figure 1:
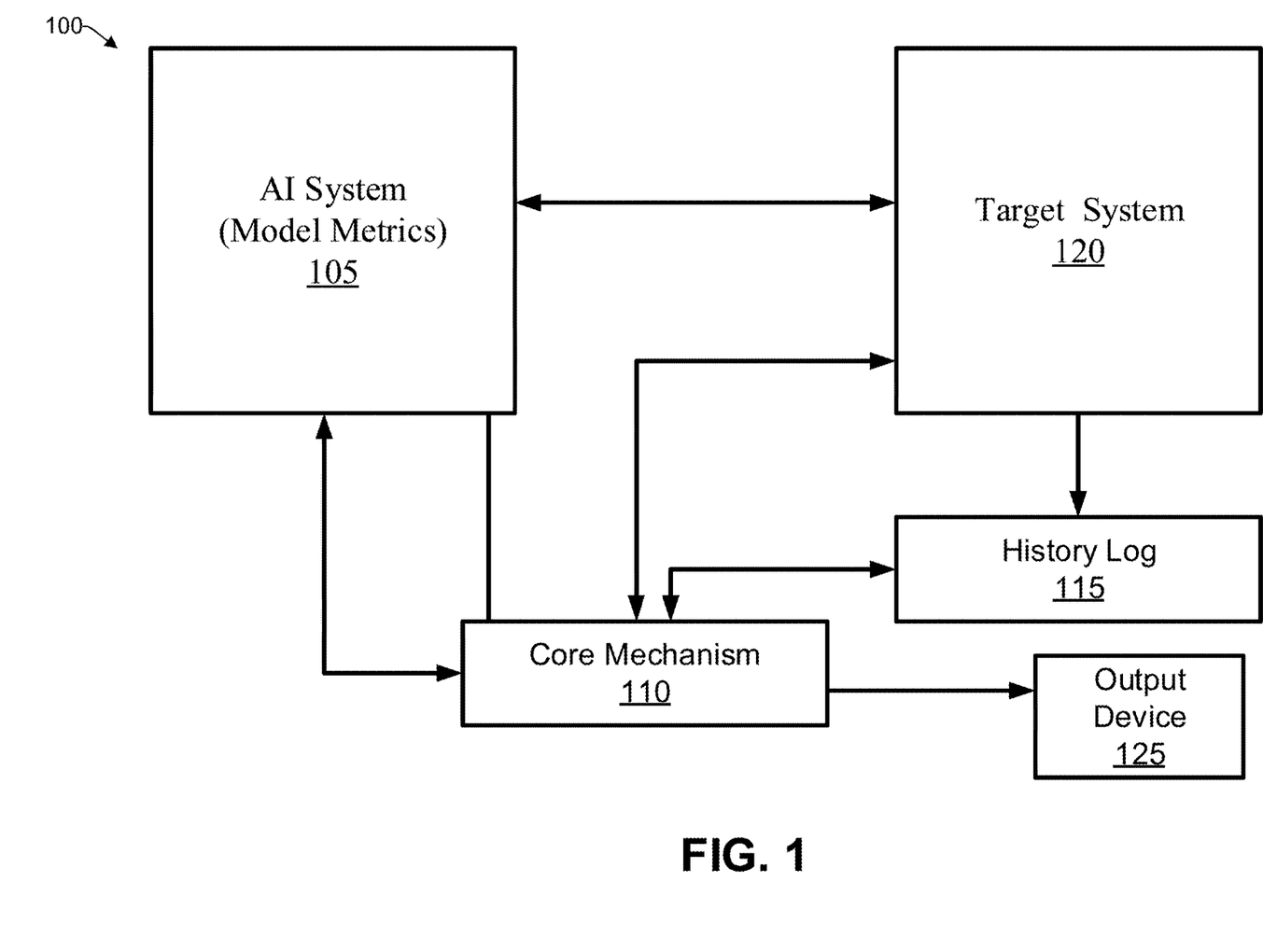
FIG. 1 is a block diagram an example architecture, consistent with an illustrative embodiment.

FIG. 1 is a block diagram of an example architecture, consistent with an illustrative embodiment. It will be understood that the block diagram is presented for explanatory purposes and does not limit the present disclosure and the appended claims. FIG. 1 shows an AI system 105 in which model metrics are generated, and a target system 120 in which the model metrics may be applied. A core mechanism 110 can be realized as a processor or sub-processor configured to receive history log data 115 of the target system 120. In an embodiment, a minimal configuration of the inventive concept can be realized by the core mechanism being configured to receive the history log data and the AI model metrics 105, and output tuning recommendations for the AI model metrics 105 via a communication interface.

The core mechanism 110 can be configured to generate a tuning recommendation of the model metrics in AI system 105 following an analysis of the history log data 115. The core mechanism 110 may output the tuning recommendation to the output device 125. The output device 125 may be a server, storage, a display, or any other type of user device, etc. The tuning recommendations may also be provided to a user in the form of an email, text, or a link. Alternatively, or in addition to an output of the tuning recommendations, the one or more notifications may be output indicating that recommendations for updating the AI model metrics are available. In a non-limiting example, the target system 120 may be a network monitoring system that has particular operational attributes that are configured by the AI model metrics 105.

The target system 120 can output history log data regarding various aspects of the network operation, as well as key performance indicators (KPI) that may include, for example, one or more indicators regarding communication speed, information regarding retry operations, hard errors, distortion information, bandwidth availability, network utilization, handoffs, etc.

In an embodiment, the history log data is a plurality of log entries, and each entry can include a set of N (one or more) model metrics and at least one KPI.

In an embodiment, the core mechanism 110 is configured to create a plurality of KPI buckets by partitioning the KPI (or KPIs as the case can be) and distribute the log data across the KPI buckets based on their association in the history log discussed in the aforementioned paragraph.

By virtue of the concepts discussed herein, various aspects of the present disclosure provide for an improvement in computer operation and in another technology (e.g., the recognition of objects/data that may be partially occluded or having a morphed or changed view point from samples. The improvement in computer operation includes improvement in the efficiency of an AI system, and improvement in the operation of target system by tuning the AI model metrics to increase the KPIs of the target system. In turn, for example, there can be improved KPIs in a network operation, can result in fewer retries, reduced utilization and increasing the available bandwidth of the network. Reduced CPU cycles, reduced memory usage, and less network utilization are provided.

Example Process

With the foregoing overview of the example architecture of FIG. 1A it may be helpful now to consider a high-level discussion of an example process, which represents a sequence of operations that can be implemented in hardware, software, or a combination thereof. In the context of software, the blocks represent computer-executable instructions that, when executed by one or more appropriately configured processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 2A:
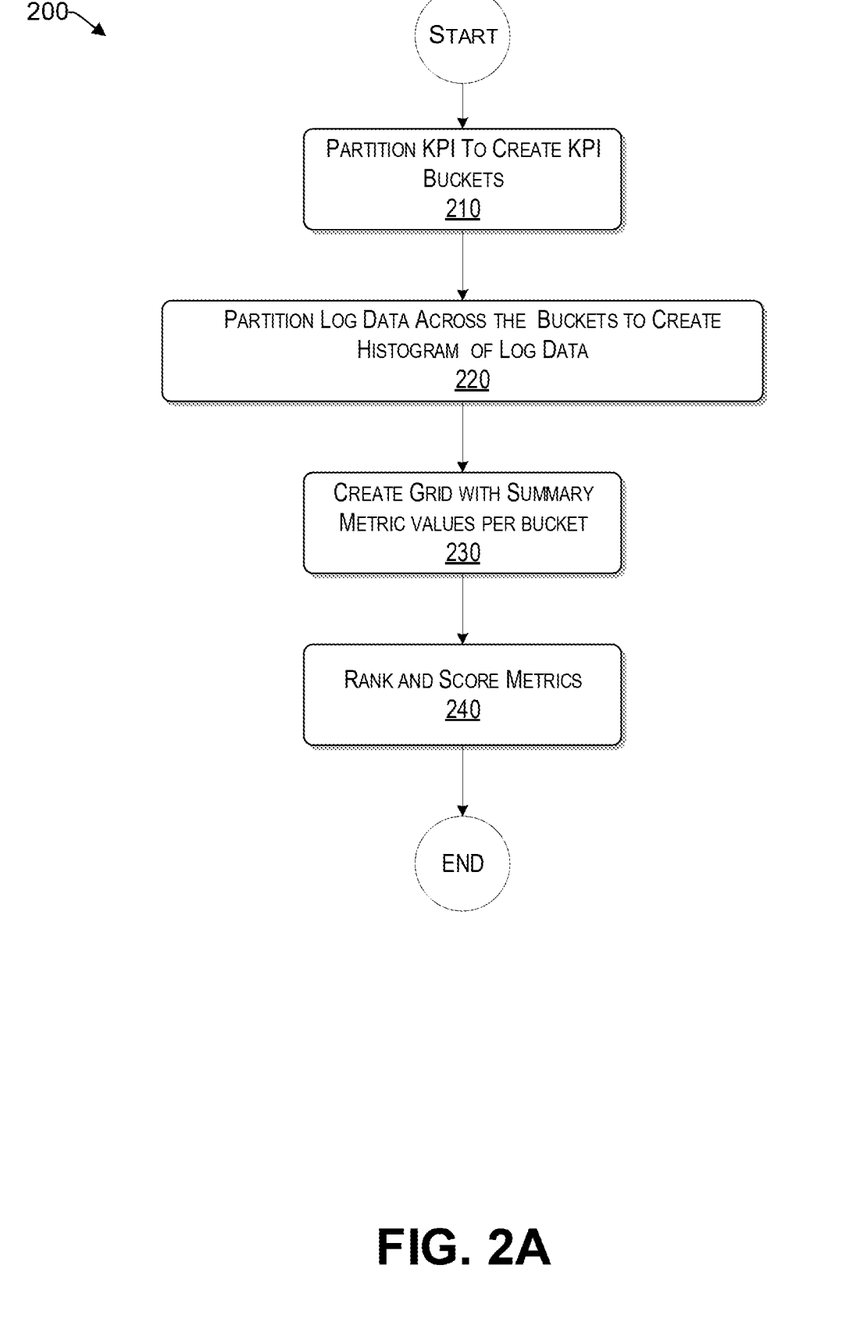
FIG. 2A is a flowchart, consistent with an illustrative embodiment.
Figure 2B:
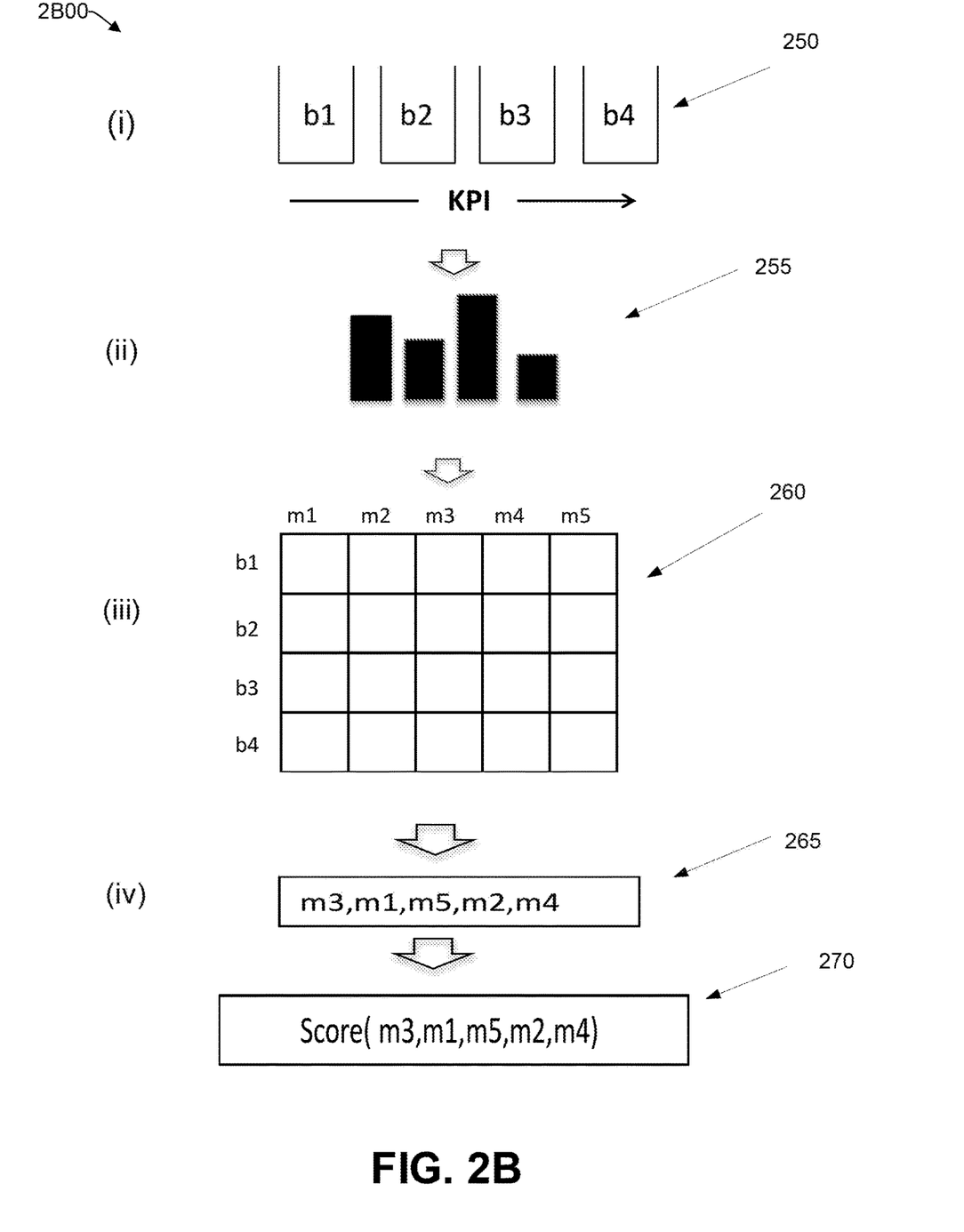
FIG. 2B is an illustration of the operations of the flowchart of FIG. 2B, consistent with an illustrative embodiment.

FIG. 2A is a flowchart illustrating operations of a tuning recommendation operation, consistent with an embodiment of the present disclosure. FIG. 2B is an illustration of the operations in flowchart 2A that is provided for illustrative purposes.

Referring to FIGS. 2A and 2B, at operation 210, the KPI is partitioned to create a plurality of KPI buckets 250 (e.g., see (i) in FIG. 2B). In one non-limiting example, the KPI is partitioned into 2 buckets, one bucket with log entries that indicate a favorable outcome in the KPI and the other bucket with entries indicating a non-favorable KPI outcome.

At operation 220, the log data is partitioned across the KPI buckets created in operation 210 to perform a histogram 255 (e.g., see (ii) in FIG. 2B).

At operation 230, a grid 260 is created by determining score values across all log entries in the bucket (e.g., see (iii) in FIG. 2B). In one non-limiting example, the score value for a metric and a KPI bucket is determined as the average value of the metrics values in that bucket. In other examples, the score value may be determined based on a further nested histogram computed for the log entries in that bucket. This operation produces a grid of K rows and N columns where K is the number of KPI buckets, N is the number of model metrics and each cell (k,n) contains the representative summary value of metric n across the log entries fall into bucket k.

At operation 240, the columns including the model metrics are ranked 265 by their score 270 (e.g., see (iv) in FIG. 2B) and a tuning recommendation and/or a report may be generated. In a case where the N model metrics and the KPI in a bucket are numeric, a correlation factor can be determined. For example, the correlation factor can be determined as a statistical correlation between the column metric values and the median KPI value of each bucket. Other computations of a correlation factor are also possible. The model metrics in the N columns can be ranked according to their respective correlation factor across the plurality of buckets and recommending a tuning of the model metric with the highest correlation factor. Other computations of the correlation factor include, for example, measuring the variability (entropy) among the metric values in the column. The computation of the correlation factor can be weighted by the relative volume of log entries in the buckets such that correlation factors determined for buckets that contain a larger portion of the log entries are higher than for buckets with lower portion of the log entries.

Figure 2C:
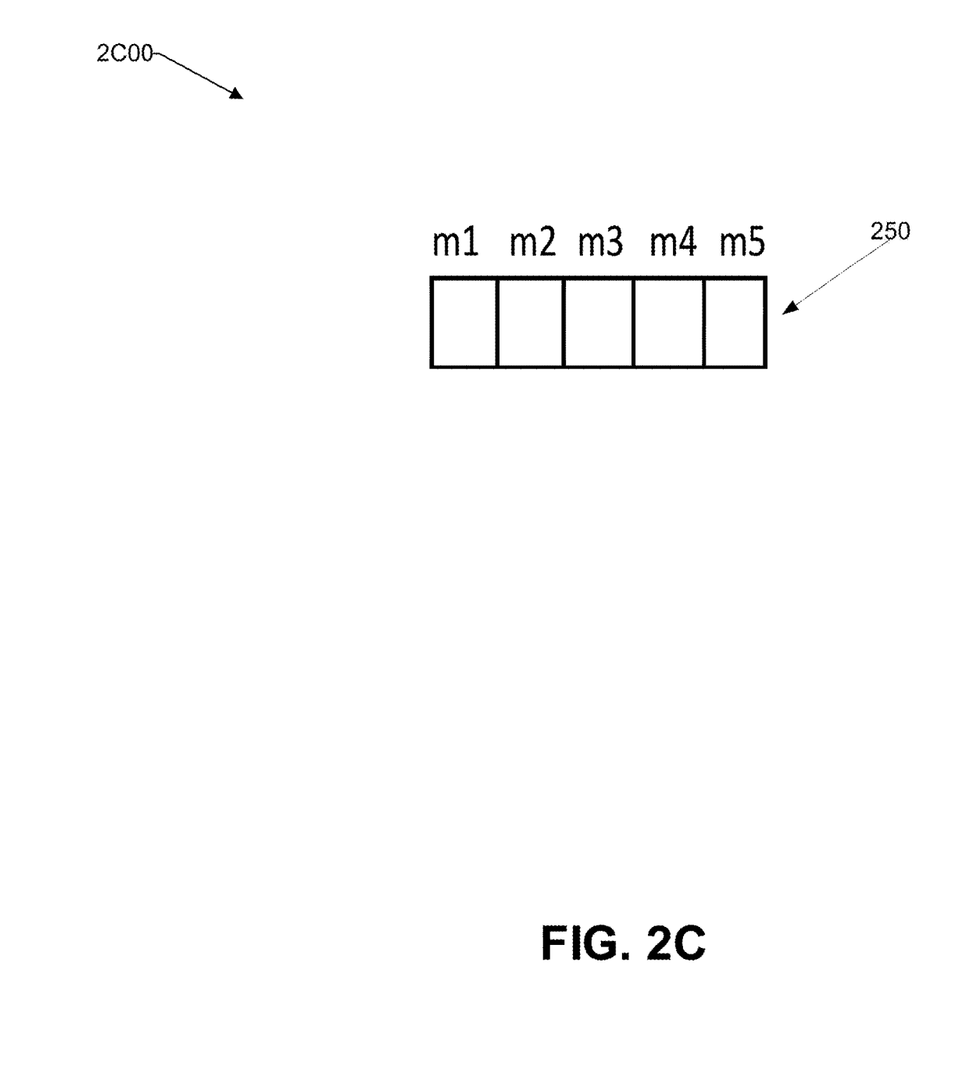
FIG. 2C is an illustration of the collapsing of the columns into a single row to determine a probability that a modification of a model metric will increase a value of the at least one KPI of the target system, consistent with an illustrative embodiment.

With reference to FIG. 2C, in another embodiment of the present disclosure, after the grid of K rows and N columns are produced (where each cell (k,n) is the average measurement of metric n across the log entries fall into KPI bucket k), the columns are collapsed (e.g., see FIG. 2C) into a single row. The correlation factor (e.g., an influence potential value), which indicates how likely an action of improving the model metric will, in turn, improve the KPI, is obtained.

It will be understood that the disclosure is not limited to the quantity of buckets as shown and described herein. Also, obtaining the summary metric value is not limited to obtaining an average (as described above).

With regard to the AI system 105, the machine learning may be supervised or unsupervised. In unsupervised learning, historic data can be provided without labels as to what is an acceptable classification. Such algorithms can operate by building a model from stored prior inputs or baselines therefrom in order to make data-driven predictions or decisions (or to provide threshold conditions) to indicate whether a communication thread belongs to a predetermined cluster, rather than following strictly static criteria. Based on machine learning, there can be patterns and trends that are identified, and any outliers identified as not belonging to the cluster.

Figure 3:
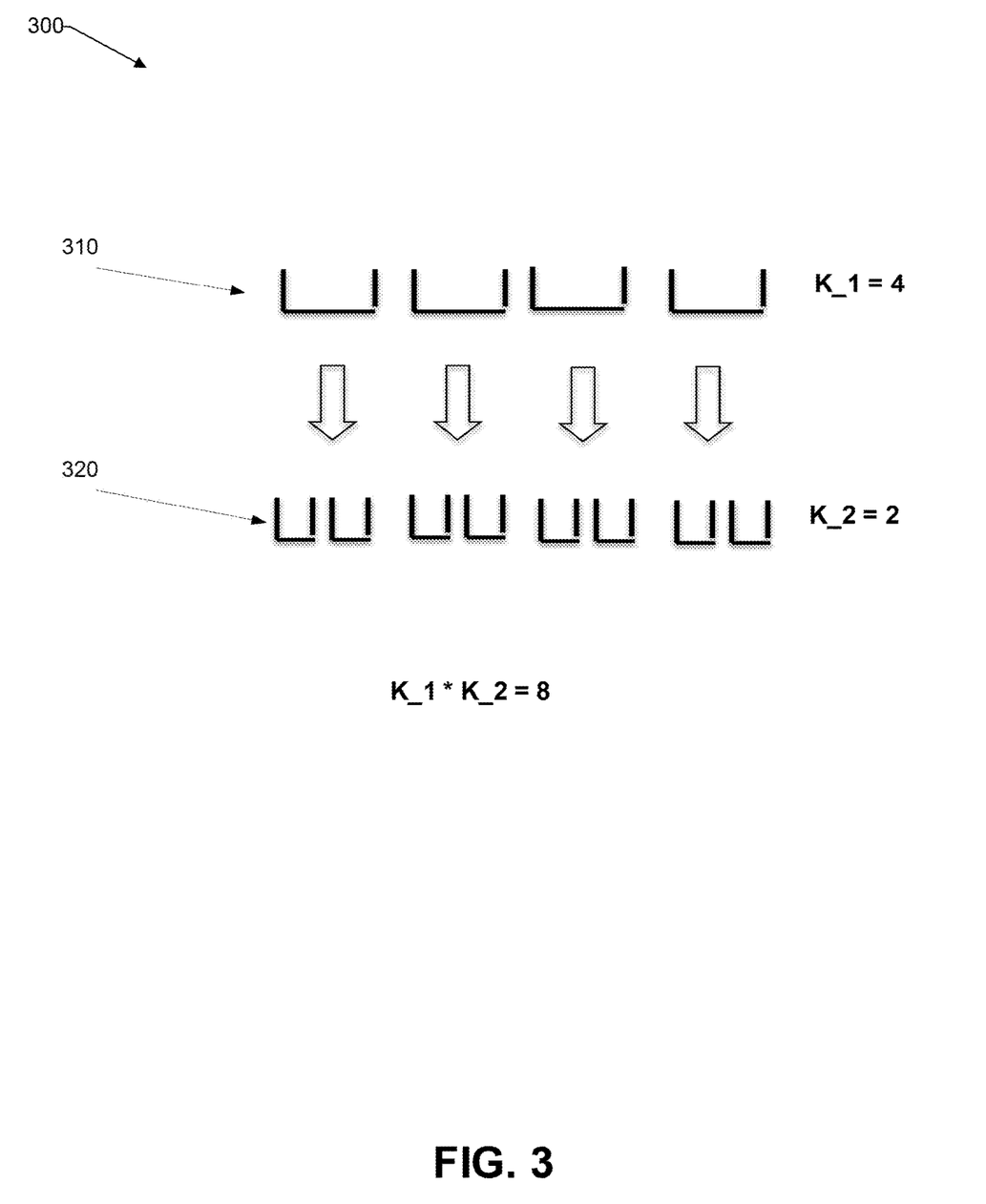
FIG. 3 illustrates partitioning by the core mechanism, consistent with an illustrative embodiment.

The machine learning may make use of techniques including supervised learning, unsupervised learning, semi-supervised learning, naïve Bayes, Bayesian networks, decision trees, neural networks, fuzzy logic models, and/or probabilistic classification models FIG. 3 illustrates partitioning by the core mechanism consistent with an illustrative embodiment. Referring now to FIG. 3, there are multiple KPIs, for example, KPI_1, KPI_2 . . . KPI_m. As shown in FIG. 3, KP1 is partitioned into K_1 buckets 310 and KP2 partitioned into K_2 buckets 320. A partitioning condition is attached to each bucket, for example 0<KPI<0.5. In a case where a number of buckets is represented by i=1 to m, further sub-partitions of each bucket are progressively created according to KPI_i, followed by adding the partitioning condition for KPI_1 to the newly created sub-buckets. The total number of partitions created is K_1*K_2* . . . K_m.

In another embodiment, the AI model metrics in the N columns are ranked according to their respective correlation factor across the plurality of buckets and a recommendation is made for tuning the model metric with a highest correlation factor.

In an embodiment, a desired (e.g., optimal) number K of KPI buckets can be determined through a tuning procedure that execute a total of E exploration operations through at least one of a random search of values of K, or a systematically explored grid search of K, and selecting a value of K among the E explored options having a maximal determined correlation factor.

Figure 4:
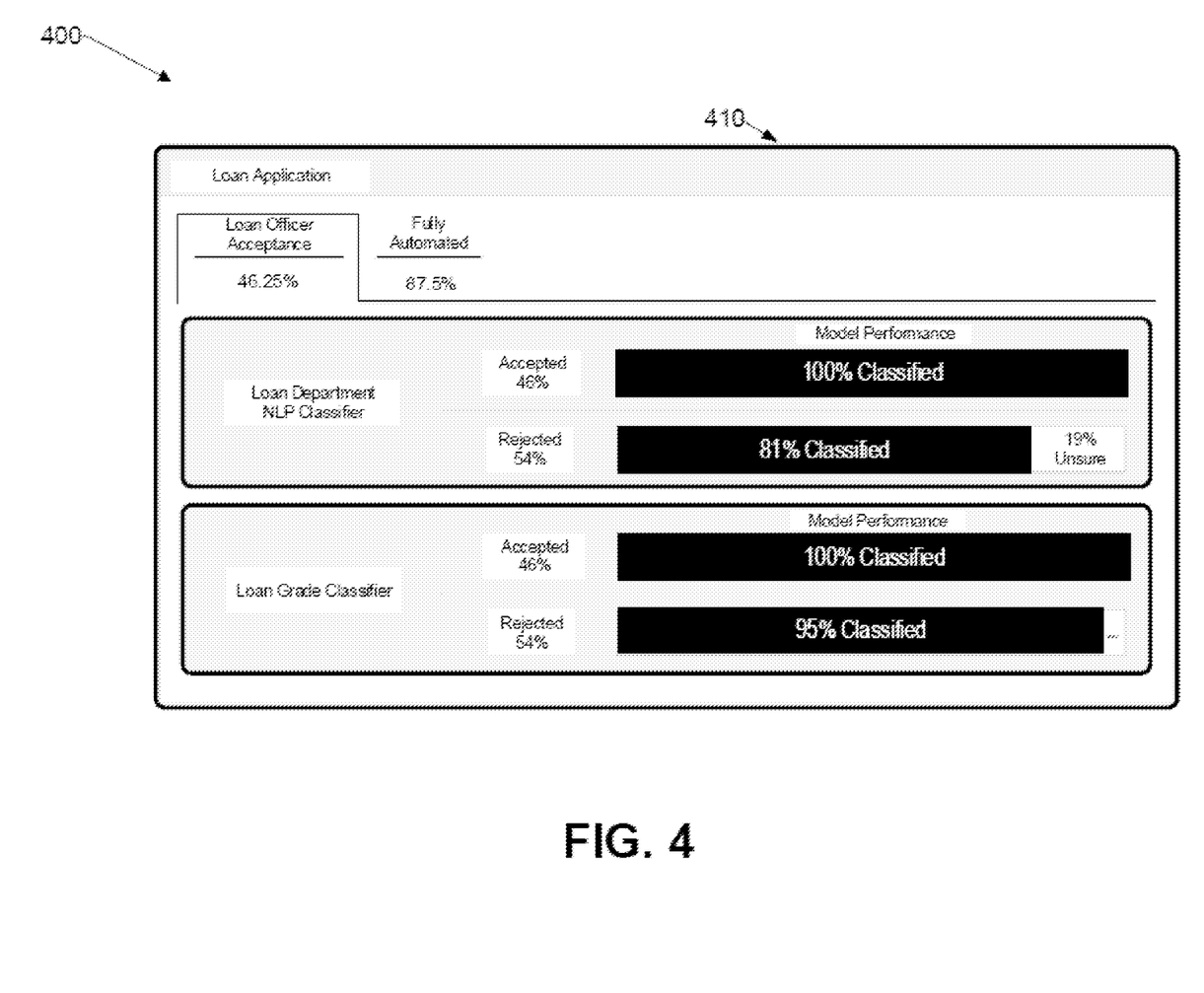
FIG. 4 illustrates an example of one of the various target systems in which nested partitioning of log data and associated KPI(s) can be analyzed to provide insight regarding the contributions of AI metric models to the KPI(s) consistent with an embodiment.

FIG. 4 is an example of one of the various target systems in which nested partitioning of log data and associated KPI(s) can be analyzed to provide insight regarding the contributions of AI metric models to the KPI(s) consistent with an embodiment.

FIG. 4 provides an overview 400 of an AI system having usage logs annotated with metrics that include at least one KPI associated with the operation (in this example a loan application) and one model-level measure (e.g., confidence). As shown, the loan application process 410 includes a Natural Language Program (NLP) classifier and a loan grade classifier. A set of nested partitions of log data can be used to determine how the AI model metrics impact the KPI, and what changes are involved to improve (e.g., increase) the KPI.

Example Computer Platform

Figure 5:
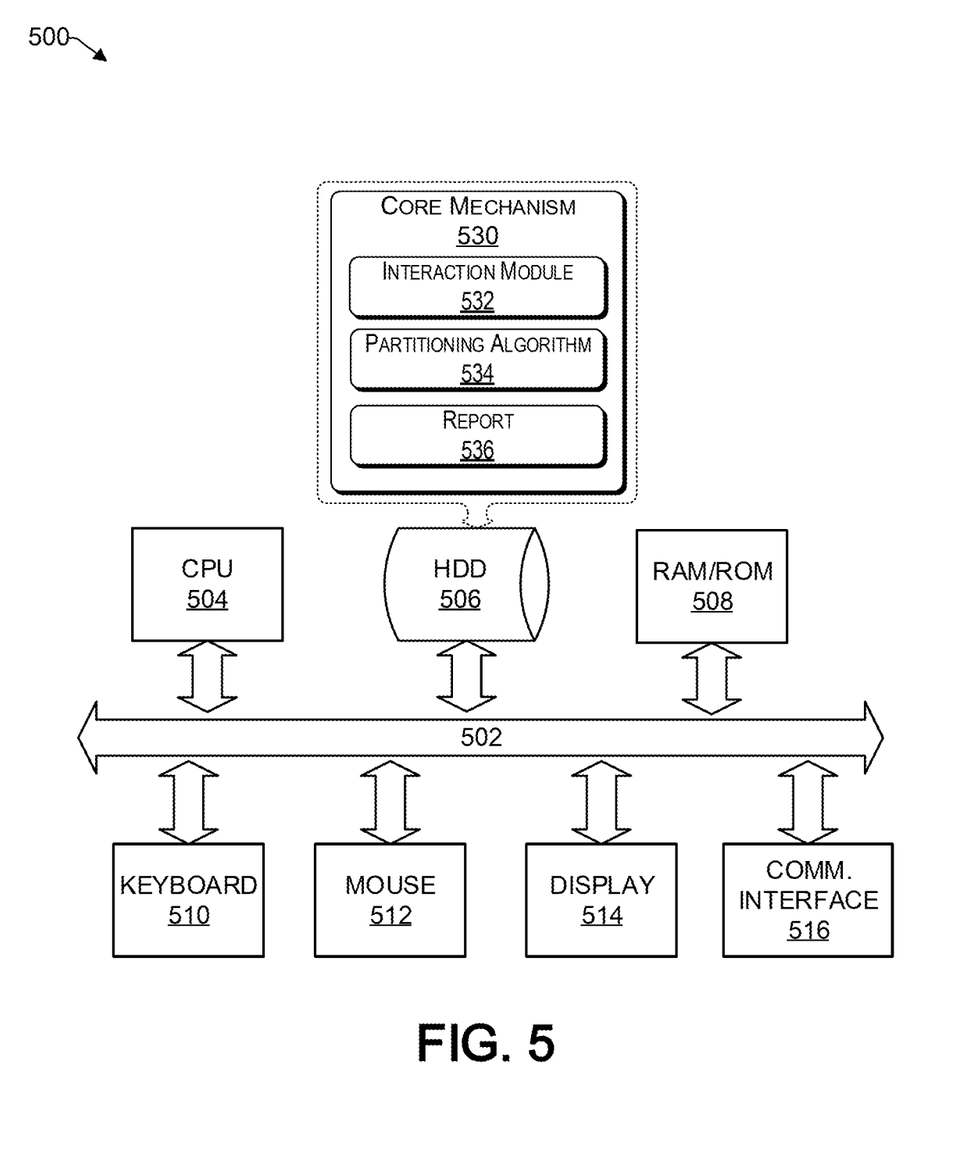
FIG. 5 is a functional block diagram illustration of a computer hardware platform that can be used to implement a method of generating actionable recommendations for tuning model metrics of an Artificial Intelligence (AI) system consistent with an illustrative embodiment.

As discussed above, functions relating to adjusting the content of electronic communication based on the expected recipients can be performed with the use of one or more computing devices connected for data communication via wireless or wired communication, as shown in FIG. 1 and in accordance with the process 200 of FIG. 2, and the implementations in FIGS. 2B and 2C. FIG. 5 is a functional block diagram illustration of a computer hardware platform that can be used to implement a particularly configured computing device that operates with the example of the block diagram configured for operation of elastic clustering shown in FIG. 1A, consistent with an illustrative embodiment. In particular, FIG. 5 illustrates a network or host computer platform 500, as may be used to implement an appropriately configured server.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the generation of actionable recommendations for tuning metric models of an Artificial Intelligence (AI) system generation of system by the core mechanism 530, in a manner described herein. Additional modules can be configured to perform different functions. For example, there may be an interaction module 532 that is operative to receive electronic data from various sources such as from the AI system 105 and/or the target system 120 (shown in FIG. 1), including log data and associated KPI information, as discussed herein. A partitioning algorithm 534 can be operative to partition the KPI range into a plurality of KPI buckets, and to partition the log data across the buckets, as discussed herein. A report module 536 can generate a report that may be stored in storage, or be provided to an output device 125 (FIG. 1). The report may include tuning recommendations of the model metrics of AI system 105 (FIG. 1) to increase at least one KPI of the target system 120, as discussed herein.

In one embodiment, a program, such as Apache™, can be stored for operating the system as a Web server. In one embodiment, the HDD 506 can store an executing application that includes one or more library software modules, such as those for the Java™ Runtime Environment program for realizing a JVM (Java™ virtual machine).

Example Cloud Platform

As discussed above, functions relating to managing the compliance of one or more client domains, may include a cloud. It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
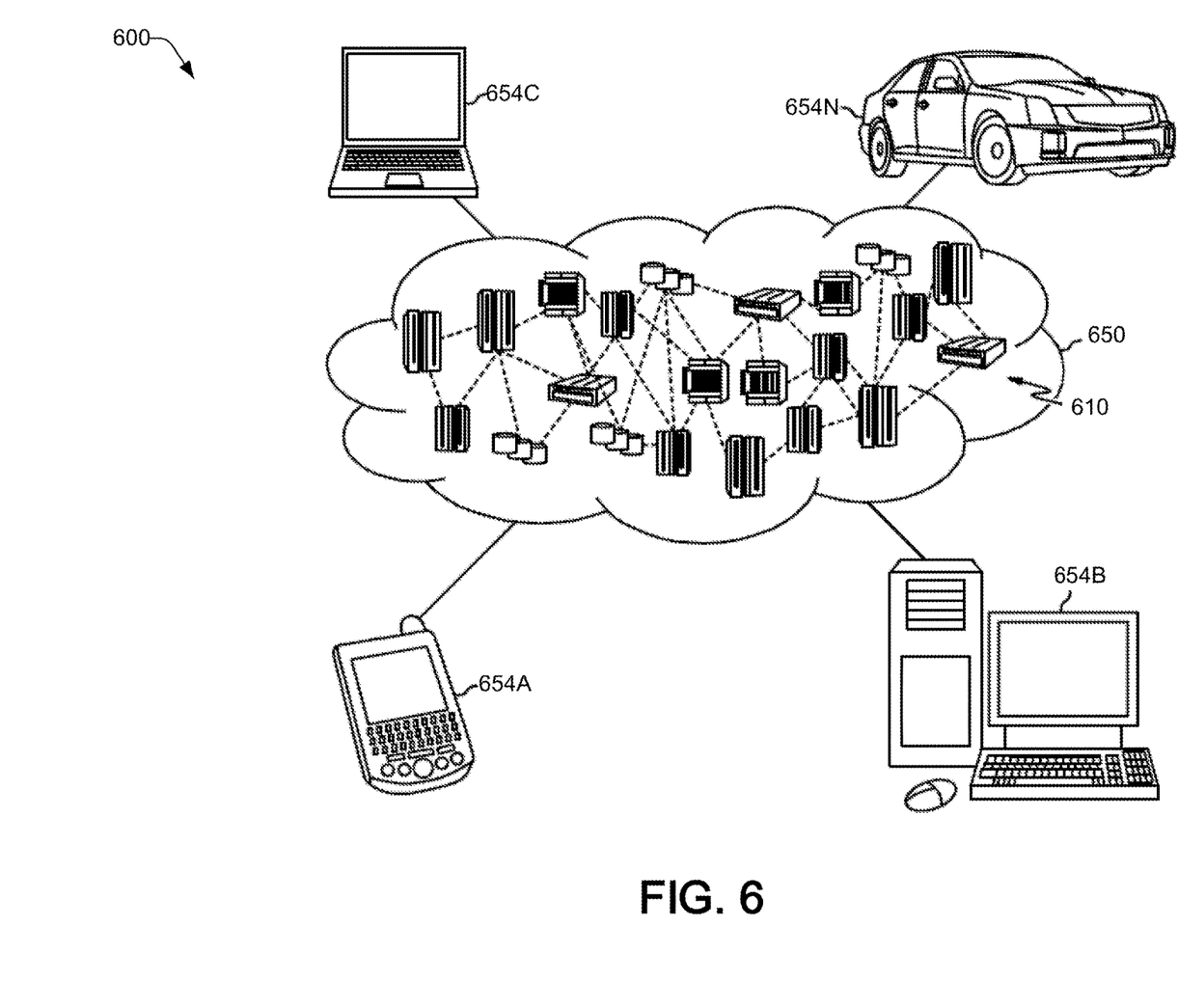
FIG. 6 depicts a cloud computing environment, consistent with an illustrative embodiment.

FIG. 6 depicts in 600 an overview of a cloud computing environment, consistent with an illustrative embodiment. There is an illustrative cloud computing environment 650. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
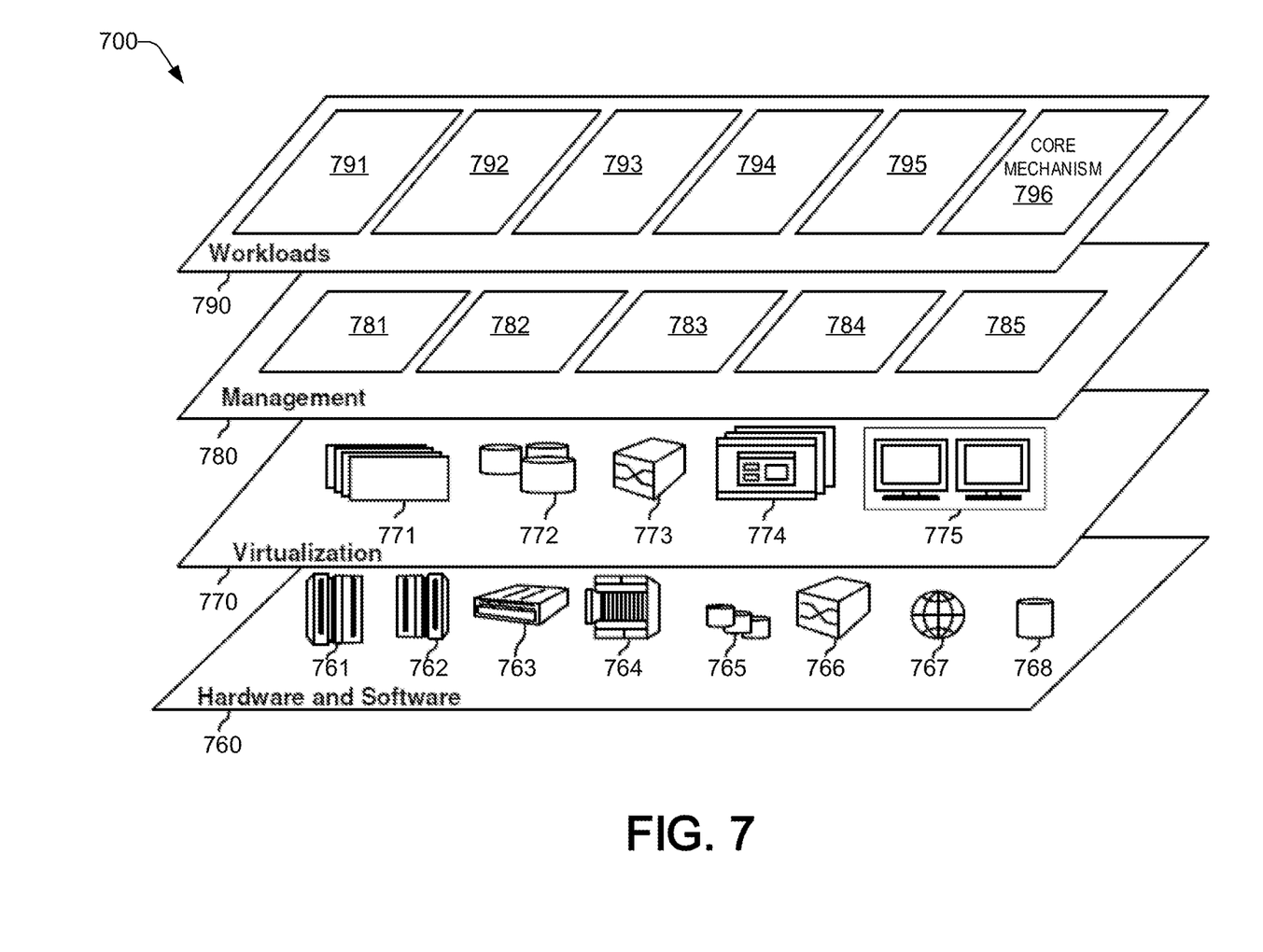
FIG. 7 depicts abstraction model layers, consistent with an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and core mechanism 796 configured to generating actionable recommendations for tuning metric models of an Artificial Intelligence (AI) system as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, a person of ordinary skill in the art should understand that the example shown in FIG. 1A is one of many ways that the architecture of the present disclosure may be embodied, and the flowchart of FIG. 2A is one of many ways that the computer implemented method, computing device and non-transitory medium of the present disclosure can be practiced.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently. For example, in an embodiment of the present disclosure, for example, by performing nested partitioning of log data, insight can be obtained regarding the accuracy of a Natural Language Processing (NLP) model in a chatbot, and its impact on customer retention, which would be represented by one or more KPIs. In another embodiment of the present disclosure, the target system may be a network operation, and an AI system 105, which is used to maximize output of the network according to predetermined criteria, can be tuned based on nested partitioning of log data and network KPIs. The AI system 105 is tunable based on recommendations made by, for example, the core mechanism via performing nested partitioning as discussed herein. In addition, in yet another embodiment of the present disclosure, the target system may be a control system for manufacturing, and in other embodiments, a system for downstreaming multimedia on a smart device, etc.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

The invention claimed is:

1. A computer-implemented method of generating actionable recommendations for tuning model metrics of an Artificial Intelligence (AI) system, the method comprising:
   partitioning a key performance indicator (KPI) range associated with a target system into a plurality of buckets;
   partitioning log data comprising at least one KPI of the target system and one or more AI model metrics across the plurality of buckets;
   computing, for each bucket of the plurality of buckets, an aggregate value of the one or more AI model metrics across the log data;
   determining a correlation factor between the aggregate values and representative KPI values of the plurality of buckets; and
   outputting a model tuning recommendation for increasing a ranking of the one or more AI model metrics according to the determined correlation factor.

2. The computer-implemented method of claim 1, further comprising weight-adjusting the computed aggregate value according to a relative volume of log data partitioned into a respective bucket.

3. The computer-implemented method of claim 1, wherein the partitioning of the log data comprises generating a histogram of the log data; and
   wherein computing the aggregate value further includes generating a grid of K rows and N columns where K is a number of KPI buckets and N is a number of model metrics and each cell (k,n) is an aggregate measurement of metric n across log entries in bucket k.

4. The computer-implemented method of claim 3, wherein determining the correlation factor includes determining a probability that a modification of a particular AI model metric will increase a value of the at least one KPI of the target system.

5. The computer-implemented method of claim 3, wherein the outputting of the model tuning recommendation further comprises:

ranking the AI model metrics in the N columns according to their respective correlation factor across the plurality of buckets; and recommending the model tuning action based on the AI model metric with a highest correlation factor.

6. The computer-implemented method of claim 5, wherein the model tuning action comprises an interactive active learning session.

7. The computer-implemented method of claim 5, wherein the model tuning action comprises a hyperparameter tuning of the AI model metrics.

8. The computer-implemented method according to claim 1, wherein the outputting the model tuning recommendation of the one or more AI model metrics further includes optimizing the number and sizes of partitioning buckets, by maximizing the correlation factor determined for the partitioning.

9. The computer-implemented method according to claim 8, wherein the optimization procedure includes:
executing a total of E exploration operations through at least one of a random search of values of the number of buckets K, or a systematically explored grid search of K, and
selecting a value of K among the E explored options having a maximal correlation factor.

10. The computer-implemented method according to claim 9, further comprising updating a deployed machine learning model of the AI system with at least one tuning recommendation of the one or more AI model metrics.

11. A computing device for determining actionable recommendations for tuning model metrics of an Artificial Intelligence (AI) system, the computing device comprising:
a core mechanism comprising a processor; and
a storage device coupled to the core mechanism;
wherein the processor is configured to:
analyze log data including at least one key performance indicator (KPI) from a target system and associated one or more AI model metrics from the AI system; and
generate a series of progressive nested partitions of the log data based on an ordering of the one or more AI model metrics; and
wherein the core mechanism is configured to output a report identifying actionable recommendations to tune at least one AI model metric to increase the at least one KPI of the target system.

12. The computing device according to claim 11, wherein the processor is further configured to:
perform nested partitions of the log data; and
update the deployed machine learning model of the AI system with at least one tuning recommendation.

13. The computing device according to claim 11, wherein the processor is further configured to:
determining a partitioning of KPI_1 into K_1 buckets;
creating sub-buckets from each of the K_1 buckets by determining a nested partitioning of each of the K_1 buckets according to partitioning KPI_2 into K_2 sub-buckets; and
progressively creating further sub-buckets for a remaining KPIs KPI_3 through KPI_m.

14. The computing device according to claim 11, wherein the processor is further configured to optimize the number and sizes of partitioned buckets by maximizing the determined correlation factor for the ranked AI model metrics for a given number and size of partitioning buckets.

15. A non-transitory computer readable storage medium tangibly embodying a computer readable program code having computer readable instructions that, when executed, causes a computer device to generate actionable recommendations for tuning model metrics of an Artificial Intelligence (AI) system, the method comprising:
partitioning a key performance indicator (KPI) range associated with a target system into a plurality of buckets;
partitioning log data comprising at least one KPI of the target system and one or more AI model metrics across the plurality of buckets;
computing for each bucket of the plurality of buckets a summary model metric value of the one or more AI model metrics across the log data;
determining a correlation factor between the summary model metric value and an aggregate KPI value for each bucket of the plurality of buckets; and
outputting a model tuning recommendation for increasing a ranking of the one or more AI model metrics according to the determined correlation factor.

16. The non-transitory computer readable storage medium according to claim 15, wherein:
the partitioning of the log data comprises generating a histogram of the log data, and
computing the summary model metric value further includes generating a grid of K rows and N columns, where K is the number of KPI buckets, N is the number of model metrics, and each cell (k,n) is an average measurement of metric n across log entries in bucket k.

17. The non-transitory computer readable storage medium according to claim 16, wherein determining the correlation factor includes collapsing the N columns of the grid into a single row and determining a probability that a modification of an AI a model metric will increase a value of the at least one KPI.

18. The non-transitory computer-readable storage medium according to claim 15, wherein the outputting the model tuning recommendation for increasing a ranking of the one or more AI model metrics further includes optimizing the number and sizes of partitioning buckets, by maximizing the correction factor determined for a given number and size of partitioning buckets.

19. The non-transitory computer-readable storage medium according to claim 15, wherein the model tuning recommendation includes optimization procedures to execute a total of E exploration operations through at least one of a random search of values of K, or a systematically explored grid search of K, and
selecting a value of K among the E explored options having a maximal score.

20. The non-transitory computer-readable storage medium according to claim 15, wherein the at least one KPI comprises a plurality of KPIs ranging from KPI_1 to KPI_m, and the plurality of buckets are formed by:
determining a partitioning of KPI_1 into K_1 buckets;
creating sub-buckets from each of the K_1 buckets by determining a nested partitioning of each of the K_1 buckets according to partitioning KPI_2 into K_2 sub-buckets; and
progressively creating further sub-buckets for the remaining KPIs KPI_3 through KPI_m.

* * * * *